(12) United States Patent
Choi et al.

(10) Patent No.: US 9,608,283 B2
(45) Date of Patent: Mar. 28, 2017

(54) STACK STRUCTURE FOR FUEL CELL

(71) Applicant: MICO LTD., Gyeonggi-do (KR)

(72) Inventors: Song Ho Choi, Anseong-si (KR); Jin Ah Park, Anseong-si (KR); Kwang Yeon Park, Dongmu-ri (KR)

(73) Assignee: MICO CO., LTD., Anseong-si (KR)

( * ) Notice: Subject to any disclaimer, the term of this patent is extended or adjusted under 35 U.S.C. 154(b) by 0 days.

(21) Appl. No.: 14/758,005

(22) PCT Filed: Nov. 21, 2013

(86) PCT No.: PCT/KR2013/010648
§ 371 (c)(1),
(2) Date: Jun. 26, 2015

(87) PCT Pub. No.: WO2014/104584
PCT Pub. Date: Jul. 3, 2014

(65) Prior Publication Data
US 2015/0357655 A1    Dec. 10, 2015

(30) Foreign Application Priority Data

Dec. 28, 2012 (KR) .................. 10-2012-0156021

(51) Int. Cl.
*H01M 8/10* (2016.01)
*H01M 8/02* (2016.01)
(Continued)

(52) U.S. Cl.
CPC ....... *H01M 8/0273* (2013.01); *H01M 8/0206* (2013.01); *H01M 8/0215* (2013.01); *H01M 8/0217* (2013.01); *H01M 8/12* (2013.01); *H01M 8/242* (2013.01); *H01M 8/2432* (2016.02); *H01M 8/2465* (2013.01);
(Continued)

(58) Field of Classification Search
CPC .................... H01M 2008/1293; H01M 8/2425
See application file for complete search history.

(56) References Cited

U.S. PATENT DOCUMENTS 6,316,136 B1 * 11/2001 Batawi ............... H01M 8/0204
                                                           429/434
2004/0121200 A1    6/2004 Johnsen et al. ............... 429/454

FOREIGN PATENT DOCUMENTS

JP    2012-038696    2/2012
KR   10-2011-0129513  12/2011
(Continued)

OTHER PUBLICATIONS

International Search Report and Written Opinion issued in PCT/KR2013/010648, dated Jan. 22, 2014.

*Primary Examiner* — Stewart Fraser
*Assistant Examiner* — Olatunji Godo
(74) *Attorney, Agent, or Firm* — Norton Rose Fulbright US LLP

(57) ABSTRACT

Provided is a stack structure for fuel cells. The stack structure includes a plurality of fuel cells stacked to generate electricity. The stack structure further includes an interconnector and a frame. The interconnector is divided into a central region supporting and electrically connected with the fuel cells and an edge region outwardly extending from an end of the fuel cell. The frame is disposed to support a side of the fuel cell in the edge region of the interconnector, and has a combined functional layer coated on an entire surface of the frame.

12 Claims, 3 Drawing Sheets

(51) Int. Cl.
*H01M 8/24* (2016.01)
*H01M 8/12* (2016.01)
(52) U.S. Cl.
CPC .. *H01M 8/0247* (2013.01); *H01M 2008/1293* (2013.01); *H01M 2300/0074* (2013.01); *Y02E 60/50* (2013.01); *Y02E 60/525* (2013.01)

(56) References Cited

FOREIGN PATENT DOCUMENTS

| KR | 10-2012-0022704 | 3/2012 |
| KR | 10-2012-0120726 | 11/2012 |

* cited by examiner

STACK STRUCTURE FOR FUEL CELL

CROSS-REFERENCED TO RELATED APPLICATION

This application is a national phase application under 35 U.S.C. §371 of International Patent Application No. PCT/KR2013/010648 filed on Nov. 21, 2013, which claims priority to and the benefit of Korean Patent Application No. 10-2012-0156021, filed on Dec. 28, 2012. The contents of the referenced applications are incorporated herein by reference in its entirety.

BACKGROUND

1. Field of the Invention

The present invention relates to a stack structure for fuel cells, and more particularly, to a stack structure in which a plurality of fuel cells are stacked to increase the amount of electric power.

2. Discussion of Related Art

Generally, a fuel cell is a generator which includes a cathode layer and an anode layer on respective surfaces of an electrolyte layer, and generates electricity by an electrochemical reaction between hydrogen and oxygen through ion conduction occurring at the electrolyte layer when an air including oxygen and a fuel gas including hydrogen are supplied to the cathode layer and the anode layer, respectively.

Recently, such a fuel cell is a high efficiency and pollution-free generator having a simple energy conversion process, and generating energy fundamentally through oxidation of hydrogen. Because of such an environment-friendly characteristic, recently, studies of fuel cells are actively progressing.

Particularly, among fuel cells, a solid oxide fuel cell (SOFC) is a fuel cell operated at a high temperature of approximately 600 to 1000° C. using a ceramic as an electrolyte, and has various advantages of the highest efficiency among the various types of fuel cells including a molten carbonate fuel cell (MCFC), a phosphoric acid fuel cell (PAFC), a polymer electrolyte fuel cell (PEFC), etc., less pollution, and enabling combined cycle power generation without a fuel processor.

A fuel cell having a set of an electrolyte layer, a cathode layer and an anode layer is usually called a single cell. Since an electricity generated by the single cell is approximately less than 1 V, which is useless, a technique of increasing a generated voltage by stacking a plurality of single cells in the form of a stack structure has received attention.

Such a stack structure must need a plurality of interconnectors having channels, which are disposed between the single cells to be electrically connected with each other and supply an air or a fuel gas at a location in contact with the cathode layer and the anode layer of the single cell. In addition, each interconnector has a sealing unit formed of a glass material, which is one of ceramic materials sealing the interconnector not to substantially mix the air or fuel gas, and must need an edge region corresponding to a surface extended from an end of the single cell to supply the air or fuel gas.

In this case, when the single cells and the interconnectors are formed to very small thicknesses to reduce a volume of the stack structure, a frame is further included in the edge region to reinforce a strength between the interconnectors and thus prevent bending or sagging caused by heat and weight during operation. In addition, a metal material is included in the frame to reinforce the strength.

In this case, during the operation of the fuel cells at the high temperature, the metal material is volatilized from the frame or diffused at an interface and then transferred to the cathode layer in contact with the air, and the metal volatile matter or diffusate generated thereby reacts with the material included in the cathode layer, thereby generating a composite oxide. Accordingly, due to the composite oxide, an electroconductive property of the single cell is degraded, and thus the electricity generating performance of the single cell may be degraded.

The sealing unit is also disposed between the frame and the interconnectors, and in this case, since the frame including the metal material and the sealing unit formed of the ceramic material are formed of materials having different properties, the frame and the sealing unit may be separated due to the difference in properties of the materials while a temperature at which the fuel cells are operated is dramatically changed, leading to the breakdown of sealability.

In addition, impurities may be generated by a different metal volatile matter generated from a tube for supplying the air or fuel gas or a metal material on a pathway thereof, a reaction phase formed outside the sealing unit by the metal material volatilized from an end of the interconnector or frame, an oxide scale formed in a part in which the interconnector faces the frame outside the sealing unit, or an insulating material fragment or dust that may be present in an external space of the sealing unit, and in this case, the impurities may produce a reaction phase along a circumference of the sealing unit, interconnector or frame, leading to an electrical shunt phenomenon in which an electric current overall flows.

SUMMARY OF THE INVENTION

The present invention is directed to providing a stack structure for fuel cells, which is formed by stacking solid oxide fuel cells to prevent volatilization or diffusion of a metal material included in a frame for reinforcing a strength, improve an adhesive strength between the frame and a sealing unit, and prevent an electrical shunt caused by impurities.

In one aspect, the present invention provides a stack structure in which a plurality of fuel cells for generating electricity, each including an electrolyte layer, and a cathode layer and an anode layer formed on respective surfaces of the electrode layer, are stacked. The stack structure includes an interconnector and a frame.

The interconnector is divided into a central region supporting each fuel cell between the plurality of fuel cells and electrically connecting the fuel cells to each other, and an edge region corresponding to a surface extended from an end of the fuel cell. The frame is disposed to support a side of the fuel cell in the edge region of the interconnector, and has a combined functional layer coated on an entire surface of the frame.

The combined functional layer according to an exemplary embodiment may be formed of an insulating ceramic material. For example, the combined functional layer may include an oxide or a glass.

The stack structure according to an exemplary embodiment may further include a gap maintaining unit to regularly maintain a gap between the interconnector and the combined functional layer of the frame in the edge region.

The stack structure according to an exemplary embodiment may further include a sealing unit sealing a gap between the interconnector and the combined functional layer of the frame in the edge region, and formed of an insulating ceramic material, a MICA material or a metal gasket.

The frame according to an exemplary embodiment may be formed of a metal-mixed material including chromium (Cr).

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a stack structure for fuel cells according to an exemplary embodiment of the present invention will be described in detail with respect to the accompanying drawings.

Figure 1:
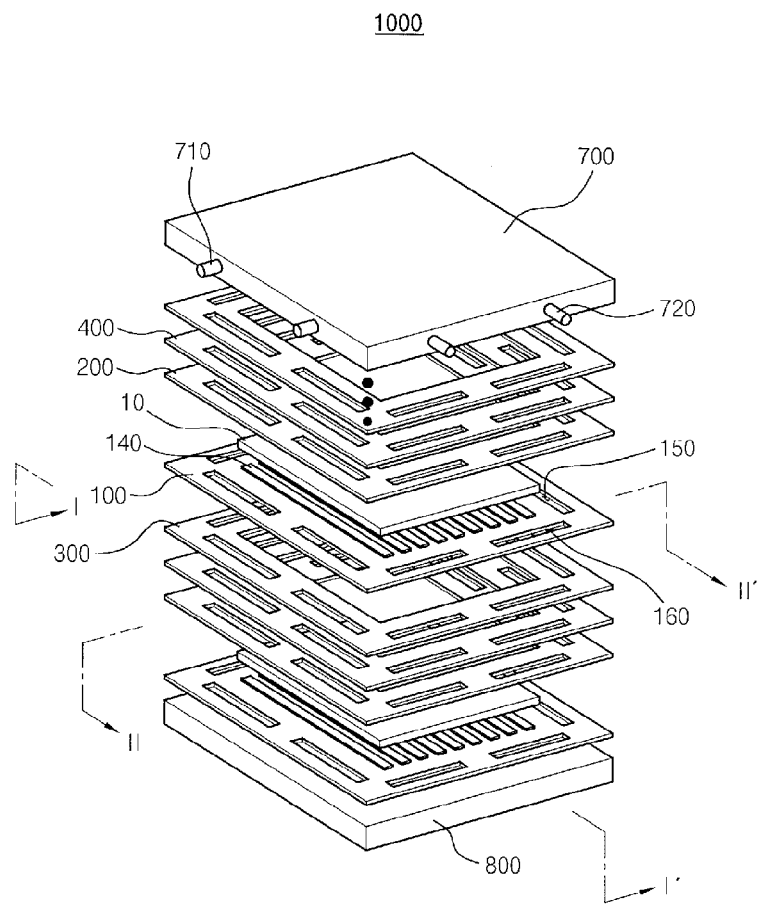
FIG. 1 is an exploded perspective view of a stack structure for fuel cells according to an exemplary embodiment of the present invention.
Figure 2:
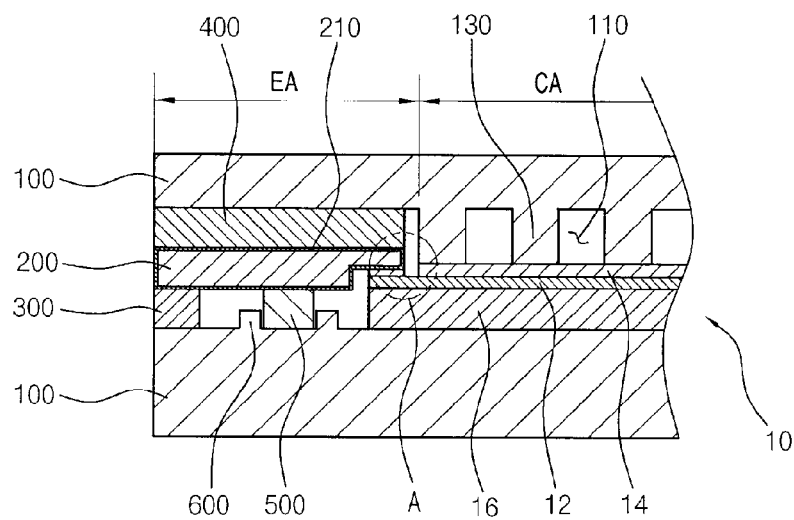
FIG. 2 is a view showing a part of the stack structure for fuel cells taken along line in FIG. 1.
Figure 3:
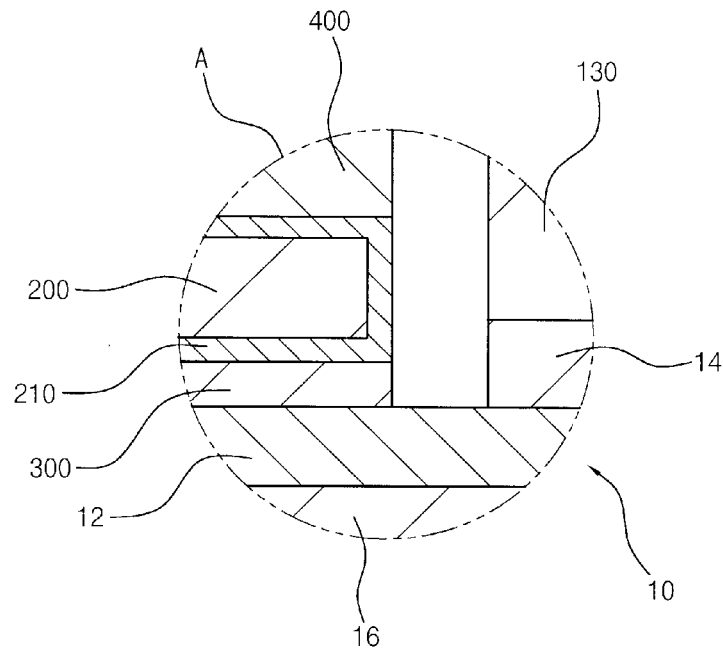
FIG. 3 is an enlarged view of A part of FIG. 2.
Figure 4:
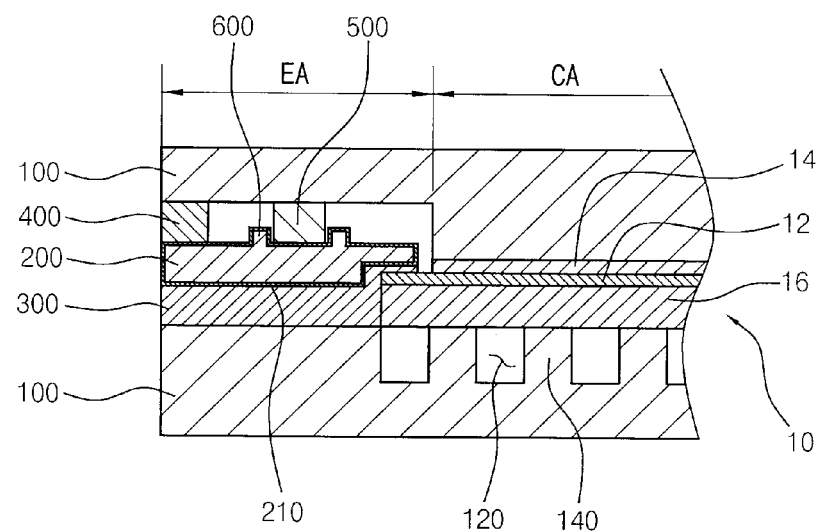
FIG. 4 is a view showing a part of the stack structure for fuel cells taken along line in FIG. 1.

FIG. 1 is an exploded perspective view of a stack structure for fuel cells according to an exemplary embodiment of the present invention, FIG. 2 is a view showing a part of the stack structure for fuel cells taken along line I-I' in FIG. 1, FIG. 3 is an enlarged view of A part of FIG. 2, and FIG. 4 is a view of a part of the stack structure for fuel cells taken along line II-II' in FIG. 1.

Referring to FIGS. 1 to 4, a stack structure 1000 for fuel cells according to an exemplary embodiment of the present invention includes a plurality of interconnectors 100 and a plurality of frames 200.

The interconnectors 100 are disposed between fuel cells 10 having a planar structure. Here, each of the fuel cells 10 includes an electrolyte layer 12, and a cathode layer 14 and an anode layer 16, which are disposed on respective surfaces of the electrolyte layer 12, and generates electricity. Specifically, in the fuel cell 10, when an air including oxygen and a fuel gas including hydrogen are supplied to the cathode layer 14 and the anode layer 16, respectively, electricity is generated by an electrochemical reaction of the hydrogen and the oxygen through ion conduction in the electrolyte layer 12.

The electrolyte layer 12 may be formed of a material having a high ion conductance, excellent stability in a redox atmosphere and an excellent mechanical property. For example, the electrolyte layer 12 may be formed of an oxide formed of at least one material selected from the group consisting of yttrium (Y), zirconium (Zr), lanthanum (La), strontium (Sr), gallium (Ga), magnesium (Mg), barium (Ba), cerium (Ce), samarium (Sm) and scandium (Sc), or a composite thereof. Alternatively, the electrolyte layer 12 may include at least one material sufficiently having the above properties, other than the above-described materials, or may be formed of an oxide formed of the material alone or a composite thereof. The fuel cell 10 including the electrolyte layer 12 is usually referred to as a solid oxide fuel cell (SOFC) and operated at a high temperature of approximately 600 to 1000° C. The cathode layer 14 may be formed of an oxide formed of at least one material selected from the group consisting of lanthanum (La), strontium (Sr), manganese (Mn), cobalt (Co) and iron (Fe) or a composite thereof to transfer oxygen. Alternatively, the cathode layer 14 may include at least one material sufficiently having the above properties, other than the above-described materials or may be formed of an oxide formed of the material alone or a composite thereof. The anode layer 16 may be formed of an oxide formed of at least one material selected from the group consisting of yttrium (Y), zirconium (Zr), strontium (Sr) and nickel (Ni) or a composite thereof to transfer hydrogen. Alternatively, the anode layer 16 may include at least one material sufficiently having the above properties, other than the above-described materials, or may be formed of an oxide formed of the material alone or a composite thereof.

The interconnectors 100 have a larger area than the fuel cell 10. In this case, each of the interconnectors 100 is divided into a central region CA supporting the fuel cell 10 and an edge region EA surrounding the central region CA and being outwardly extended from an end of the fuel cell 10.

Each of the interconnectors 100 may be formed of a conductive material, and be electrically connected with the cathode layer 14 of one of adjacent fuel cells and the anode layer 16 of the other of the adjacent fuel cells 10 in contact with the interconnector 100 in the central region CA. For example, the interconnector 100 may be formed of a metal-mixed material including chromium (Cr), nickel (Ni) and iron (Fe).

As described above, the stacked fuel cells 10 are connected by the interconnectors 100 in series, thereby obtaining electricity with a higher voltage. Here, a porous current collector (not shown) may be further disposed between the interconnector 100 and the cathode layer 14 or anode layer 16 of the fuel cell 10 to efficiently collect the electricity generated therefrom.

In addition, the interconnector 100 may include first and second channel forming units 130 and 140 to form pluralities of first and second channels 110 and 120 on respective surfaces in the central region CA which face the cathode layer 14 of the one of the adjacent fuel cells 10 and the anode layer 16 of the other of the adjacent fuel cells 10, respectively. The air and fuel gas can be uniformly supplied to the cathode layer 14 and the anode layer 16 by the first and second channels 110 and 120, respectively. Here, the first and second channel forming units 130 and 140 may be formed along directions perpendicular to each other in a two-dimensional structure in order that the air and fuel gas are supplied and exhausted along the first and second channels 110 and 120, respectively, without mixed together, in this case, in the interconnector 100, air holes 150 may be formed in first and second sides facing each other along the first channel 110 through which the air flows, and fuel holes 160 may be formed in third and fourth sides facing each other along the second channel 120 through which the fuel gas flows.

The frames 200 are disposed between the interconnectors 100 in the edge region EA. The frame 200 may additionally support a side of the fuel cell 10 and reinforce a strength of the stack structure 1000 to prevent bending or sagging of the fuel cells 10 and the interconnectors 100 caused by heat or a weight during operation of the stack structure 1000. In addition, the frame 200 may be disposed to surround a part of the side of the fuel cell 10 supported by the interconnector 100 to fix the fuel cell 10 at a predetermined position. In this case, in a process of manufacturing the fuel cell 10, after sintering the electrolyte layer 12 and the anode layer 16, the cathode layer 14 is formed on the electrolyte layer 12 to expose an edge portion of the electrolyte layer 12. Thus, the frame 200 may be disposed to surround and fix a part of the exposed edge portion of electrolyte layer 12. For example, the frame 200 may have an opening that is disposed adjacent to an edge of the cathode layer 14 and surrounds the edge of the cathode layer 14.

In addition, the frame 200 may be formed of a metal material to reinforce the strength of the stack structure 1000. Here, the frame 200 may partially include a chromium (Cr) material relatively highly resistant to heat to endure a high temperature of approximately 600 to 1000° C. at which the fuel cell 10 is operated. In addition, the frame 200 may be formed of a metal-mixed material further including nickel (Ni) and iron (Fe). In addition, when the frame 200 formed of such a metal material is electrically connected with the interconnector 100, electricity generated from the fuel cell 10 located between them is not collected, and thus the frame 200 must be insulated from the interconnector 100.

The frame 200 has a combined functional layer 210 coated on an entire surface of the frame 200. The combined functional layer 210 may prevent volatilization of a metal material, particularly, chromium (Cr), included in the frame 200 or prevent generation of a composite oxide by reaction of a metal volatile matter or diffusate generated through diffusion of the metal material at an interface and the material included in the cathode layer 14 to which an air is supplied, for example, lanthanum (La), strontium (Sr), manganese (Mn), cobalt (Co) or iron (Fe). Accordingly the combined functional layer 210 may prevent degradation in an electroconductive property, air permeability and a catalytic activity of the cathode layer 14 caused by the composite oxide and thus may prevent degradation of an electricity generating performance of the fuel cell 10.

The combined functional layer 210 may be formed of an insulating ceramic material to obtain excellent thermal resistance and basic insulation from the interconnector 100. For example, the combined functional layer 210 may be formed of an oxide formed of at least one selected from the group consisting of yttrium (Y), zirconium (Zr), strontium (Sr), magnesium (Mg), aluminum (Al), barium (Ba), silicon (Si) and calcium (Ca) or a composite thereof. Alternatively, the combined functional layer 210 may be formed of a glass material. All of such materials basically have excellent sealability at a high temperature.

Meanwhile, the stack structure 1000 may further include first and second sealing units 300 and 400 disposed to seal spaces between the combined functional layer 210 of the frame 200 and the edge regions EA of the interconnectors 100 located on respective surfaces of the combined functional layer 210. The first and second sealing units 300 and 400 may prevent leakage and mixing of an air and a fuel gas flowing to the cathode layer 14 and the anode layer 16 of the fuel cell 10. Here, any one of the first and second sealing units 300 and 400 may be extended to a part of the frame 200 surrounding a part of the electrolyte layer 12 to fix a position of the fuel cell 10. Although the frame 200 is basically insulated by the combined functional layer 210, electricity may flow between the frame 200 and the electrolyte layer 12. Therefore, the present invention can perfectly exclude the possibility using the first or second sealing unit 300 or 400.

The first and second sealing units 300 and 400 may be formed of an insulating ceramic material to basically obtain excellent sealability, and to insulate the frame 200 from the interconnectors 100. In this case, the first and second sealing units 300 and 400 may be formed of a material having a substantially similar property to the combined functional layer 210 having excellent insulability and sealability, for example, an insulating ceramic material, a MICA material or a metal gasket. Here, when the first and second sealing units 300 and 400 are formed of a glass material, which is one of the insulating ceramic materials, the first and second sealing units 300 and 400 naturally have flowability because of the characteristic of the glass. For this reason, the flowability may be controlled by adding a fiber to the glass material.

As described above, since the combined functional layer 210 of the frame 200 is formed of an insulating ceramic material having a similar property to the first and second sealing units 300 and 400 for sealing the space between the interconnector 100 and the frame 200, an adhesive strength between the combined functional layer 210 and the first and second sealing units 300 and 400 may be improved. Therefore, even when an operating temperature of the fuel cell 10 is dramatically changed, the sealability between the interconnector 100 and the frame 200 may be maintained. In addition, the combined functional layer 210 of the frame 200 may prevent generation of a reaction phase capable of inducing insulation breakdown between the interconnectors 100 and the frames 200, so that the degradation in electricity generating performance of the fuel cell 10 caused by the reaction phase may be further prevented.

Moreover, since the combined functional layer 210 of the frame 200 is formed on the entire surface of the frame 200, an electrical leakage caused by reaction phases formed by the input of various impurities generated by a different metal volatile matter generated from a tube for supplying the air or fuel gas or a metal material on a pathway thereof, a reaction phase formed outside the first and second sealing units 300 and 400 by the metal material volatilized from an end of the interconnector 100 or frame 200, an oxide scale formed in a part in which the interconnector 100 faces the frame 200 outside the first and second sealing units 300 and 400, or an insulating material fragment or dust that may be present in an external space of the first and second sealing units 300 and 400 may be prevented. Therefore, the flow of electricity to an undesired pathway may be prevented, and the degradation in electricity generating performance of the fuel cell 10 may also be prevented.

Accordingly, only with the structure in which the combined functional layer 210 is coated on the entire surface of the frame 200, an effect of ensuring long-term stability, which is the most important in the stack structure 1000 for fuel cells as a generator, may be expected.

Figure 5:
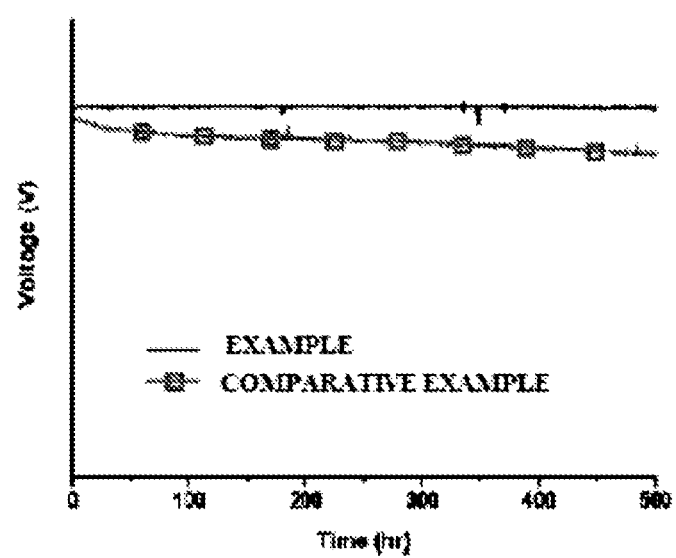
FIG. 5 is a graph showing test results for the stack structure shown in FIG. 1 according to Example in which a combined functional layer is coated on a frame and Comparative Example in which the combined functional layer is coated only on a top surface of the frame.

Hereinafter, the effect will be described in detail with reference to a graph of FIG. 5 showing Example in which the combined functional layer 210 is formed on the entire surface of the frame 200 of the present invention and Comparative Example in which the combined functional layer 210 is formed only on a top surface of the frame 200.

FIG. 5 is a graph showing experiment results for the stack structure shown in FIG. 1 according to Example in which the combined functional layer is coated on the entire surface of the frame in the stack structure shown in FIG. 1 and Comparative Example in which the combined functional layer is coated only on a top surface of the frame.

Further referring to FIG. 5, in the present experiment, the experiment was performed to detect an electricity generating voltage according to time on the stack structures including the same number of the fuel cells, the same number of the interconnectors and the frames. However, in Example, the combined functional layer 210 was formed on an entire surface of each of the frames 200, and in Comparative Example, the combined functional layer 210 was formed only on a top surface of each of the frames 200.

As a result, it was confirmed that, while the electricity generating voltage was almost uniform until approximately 500 hours in Example, the electricity generating voltage in Comparative Example was lower than that of Example from the beginning and continuously decreased after that. Accordingly, when the combined functional layer 210 was formed only on a partial surface of the frames 200, it was confirmed that a performance was degraded as described above through generation of a composite oxide, electrical shunt occurring by a reaction phase caused by impurities, or dielectric breakdown. Accordingly, when the combined functional layer 210 is not formed on the frame 200, the performance may be expected to be further degraded.

Accordingly, when the combined functional layer 210 is formed on the entire surface of the frames 200 in accordance with the present invention, it can be confirmed that the electricity generating voltage, which is the most important in the generator, that is, the fuel cell 10, is apparently stable for a long time, compared to when the combined functional layer 210 is not formed on the entire surface of the frames 200.

In addition, in the stack structure 1000, the frame 200 and the interconnector 100 can be electrically shorted even though the insulating combined functional layer 210 is disposed between the frame 200 and the interconnector 100 in the edge region EA. In order to completely exclude this, the stack structure 1000 may further include at least one gap maintaining unit 500 uniformly maintaining the gap between them. In embodiments, the gap maintaining unit 500 may be a separate component from the frame 200 and the interconnectors 100. Alternatively, the gap maintaining unit 500 may be integrally formed with the frame 200 or the interconnectors 100. For example, the gap maintaining unit 500 may protrude from any one of the frame 200 and the interconnectors 100. Specifically, the gap maintaining unit 500 corresponding to the anode layer 16 may be formed on the interconnector 100 in a dot type, and the gap maintaining unit 500 corresponding to the cathode layer 14 may be formed on the frame 200 in a dot type. In this case, since the gap maintaining unit 500 formed on the frame 200 substantially form a simple concavo-convex surface of the frame 200, the combined functional layer 210 may also be formed on the gap maintaining unit 500.

In embodiments, the gap maintaining unit 500 may be formed of an insulating ceramic material having a similar property to the combined functional layer 210. For this reason, an adhesive strength between the gap maintaining unit 500 and the combined functional layer 210 may be improved, and the gap maintaining function may be more stably accomplished. In addition, the gap maintaining unit 500 may be located at an inlet or outlet of a pathway of an air or fuel gas to uniformly flow the air or fuel gas through the first or second channel 110 or 120. In addition, a plurality of gap maintaining units 500 may be disposed in one line along a stacking direction of the stack structure 1000 to efficiently support all of the interconnectors 100 and the frames 200, which are alternately stacked.

In addition, the stack structure 1000 may further include a plurality of supporting units 600 for supporting a side of the gap maintaining unit 500 to stably fix the location of the gap maintaining unit 500. The supporting units 600 may be protrude from any one of the frame 200 and the interconnectors 100. Specifically, the supporting units 600 corresponding to the anode layer 16 may be formed on the interconnector 100 in a dot type, and the supporting units 600 corresponding to the cathode layer 14 may be formed on the frame 200 in a dot type. In this case, since the supporting units 600 formed on the frame 200 forms a concavo-convex surface of the frame 200, the combined functional layer 210 may be formed on the supporting units 600.

In addition, the stack structure 1000 may further include first and second end plates 700 and 800 disposed at both stacked ends to protect the fuel cells 10, the interconnectors 100 and the frames 200 from an outside and improve an entire strength of the stack structure 1000.

In the first end plate 700, to respectively supply an air and a fuel gas to the cathode layer 14 and the anode layer 16 of the fuel cell 10, first and second connecting sockets 710 and 720 connected to external air supplier (not shown) and fuel gas supplier (not shown) may be formed. Accordingly, the first and second connecting sockets 710 and 720 may be substantially connected to the air hole 150 and the fuel hole 160, respectively; thereby having a structure for supplying an air and a fuel gas to them.

In the specification, it has been described that the stack structure of the present invention is preferably applied to a solid oxide fuel cell (SOFC) using ceramic as an electrolyte, but it would be understood that, to increase the amount of electric power, the stack structure of the present invention may also be applied to another fuel cell capable of having a stack structure such as molten carbonate fuel cell (MCFC), phosphoric acid fuel cell (PAFC) or a polymer electrolyte fuel cell (PEFC).

In the above-explained detail description, the present invention was explained with reference to exemplary embodiments of the present invention, but it would be understood by those of ordinary skill in the art that the present invention will be modified and changed in various ways without departing from the idea and technical field of the present invention.

As described above, in the stack structure in which a plurality of the fuel cells are stacked, as the combined functional layer for preventing volatilization or diffusion of the metal material is coated on the entire surface of the frame including the metal material to reinforce a strength of the stack structure between the interconnectors, generation of a composite oxide decreasing an electroconductive property, air permeability and a catalytic activity of the cathode layer by the metal volatile matter or diffusate may be prevented, an adhesive strength may be improved by forming the combined functional layer using an insulating ceramic material having a similar property to the sealing unit, and an electrical shunt caused by reaction phases formed by inputting various impurities including a metal material or metal oxide included in a fuel gas or air may be prevented, and thus an electricity generating performance of the stack structure may be stably maintained for a long time.

According to a stack structure for fuel cells of the present invention, generation of a composite oxide by a reaction of a metal volatile matter or diffusate with a material of a cathode layer to which an air is supplied may be prevented by coating a combined functional layer for preventing volatilization or diffusion of a metal material on an entire surface of a frame including the metal material to reinforce a strength of the stack structure between a plurality of interconnectors and to endure a high operating temperature of a solid oxide fuel cell (SOFC), for example, approximately 600 to 1000° C. As a result, the degradation in an electroconductive property, air permeability and a catalytic activity of the cathode layer caused by the composite oxide may be prevented, and the degradation in an electricity generating performance of the fuel cell may be prevented.

In addition, as the combined functional layer of the frame is formed of an insulating ceramic material having a similar property to the sealing unit for sealing a gap between the interconnector and the frame, an adhesive strength between the combined functional layer and the sealing unit may be improved.

Moreover, since the combined functional layer of the frame is formed on the entire surface of the frame, an electrical shunt caused by reaction phases formed by the input of various impurities generated by a different metal volatile matter generated from a tube for supplying the air or fuel gas or a metal material on a pathway thereof, a reaction phase formed outside the sealing unit by the metal material volatilized from an end of the interconnector or frame, an oxide scale formed in a part in which the interconnector faces the frame outside the sealing unit, or an insulating material fragment or dust that may be present in an external space of the sealing unit may be prevented. Therefore, the flow of electricity to an undesired pathway may be prevented, and the degradation in electricity generating performance of the fuel cell may also be prevented.

As described above, in the present invention, it is expected to ensure long-term stability which is the most important property of the stack structure for fuel cells as a generator, only with the structure in which the combined functional layer is coated on the entire surface of the frame.

While the invention has been shown and described with reference to certain exemplary embodiments thereof, it will be understood by those skilled in the related art that various changes in form and details may be made therein without departing from the scope of the invention as defined by the appended claims.

What is claimed is:

1. A fuel cell stack structure, comprising:
    a fuel cell comprising an electrolyte layer, a cathode layer, and an anode layer on respective surfaces of the electrolyte layer;
    a first interconnector disposed on the fuel cell, the first interconnector comprising a first central region overlapping with the cathode layer and a first edge region surrounding the first central region and outwardly extending from an end of the fuel cell;
    a second interconnector disposed under the fuel cell, the second interconnector comprising a second central region overlapping with the anode layer of the fuel cell and a second edge region surrounding the second central region and outwardly extending from the end of the fuel cell; and
    a frame comprising an opening exposing one of the cathode layer and the anode layer to be disposed between the first edge region of the first interconnector and the second edge region of the second interconnector, the frame supporting an edge region of the fuel cell and comprising an insulating combined functional layer coated on an entire surface thereof.

2. The structure according to claim 1, wherein the combined functional layer comprises an insulating ceramic material.

3. The structure according to claim 2, wherein the combined functional layer includes an oxide or a glass.

4. The structure according to claim 1, further comprising:
    a gap maintaining unit disposed between one of the first and second interconnectors and the combined functional layer of the frame to uniformly maintain a gap therebetween.

5. The structure according to claim 1, further comprising:
    a sealing unit disposed between one of the first and second interconnectors and the combined functional layer of the frame to seal a space therebetween, the sealing unit comprising an insulating ceramic material.

6. The structure according to claim 1, wherein the frame is formed of a metal material including chromium (Cr).

7. The structure according to claim 1, wherein the fuel cell includes a solid oxide fuel cell (SOFC).

8. The structure according to claim 4, wherein the gap maintaining unit comprises an insulating ceramic material.

9. The structure according to claim 4, further comprising a plurality of supporting units for supporting a side of the gap maintaining unit.

10. The structure according to claim 9, wherein the supporting units protrude from any one of the frame, the first interconnector and the second interconnector.

11. The structure according to claim 4, wherein the gap maintaining unit protrudes from any one of the frame, the first interconnector and the second interconnector.

12. The structure according to claim 1, further comprising a current collector disposed between one of the first and second interconnectors and the cathode layer.

* * * * *